United States Patent
Kambara et al.

(10) Patent No.: US 8,404,208 B2
(45) Date of Patent: Mar. 26, 2013

(54) METHOD FOR PRODUCING CARBON FIBER

(75) Inventors: Eiji Kambara, Kawasaki (JP); Akihiro Kitazaki, Kawasaki (JP)

(73) Assignee: Showa Denko K.K., Tokyo (JP)

( * ) Notice: Subject to any disclaimer, the term of this patent is extended or adjusted under 35 U.S.C. 154(b) by 0 days.

(21) Appl. No.: 12/997,834

(22) PCT Filed: Jun. 16, 2009

(86) PCT No.: PCT/JP2009/002725
§ 371 (c)(1),
(2), (4) Date: Dec. 13, 2010

(87) PCT Pub. No.: WO2009/153968
PCT Pub. Date: Dec. 23, 2009

(65) Prior Publication Data
US 2011/0105685 A1    May 5, 2011

Related U.S. Application Data

(60) Provisional application No. 61/075,210, filed on Jun. 24, 2008.

(30) Foreign Application Priority Data

Jun. 18, 2008   (JP) ................. 2008-159788

(51) Int. Cl.
*D01F 9/12*   (2006.01)
(52) U.S. Cl. .............. 423/447.3; 502/321; 502/324; 502/325; 502/326; 977/843
(58) Field of Classification Search ........... 423/447.1, 423/447.3, 445 B, DIG. 40; 502/300, 305, 502/321, 324, 325, 326, 335
See application file for complete search history.

(56) References Cited

U.S. PATENT DOCUMENTS

| | | |
|---|---|---|
| 5,707,916 A | 1/1998 | Snyder et al. |
| 6,529,312 B1 | 3/2003 | Saxe |
| 2005/0074392 A1* | 4/2005 | Yang et al. ............... 423/447.3 |
| 2008/0176070 A1 | 7/2008 | Kitazaki et al. |
| 2009/0140215 A1 | 6/2009 | Buchholz et al. |
| 2011/0104490 A1 | 5/2011 | Kambara et al. |

FOREIGN PATENT DOCUMENTS

| | | | |
|---|---|---|---|
| EP | 1 782 884 A1 | | 5/2007 |
| JP | 2004273433 A | * | 9/2004 |
| WO | 2006/050903 A2 | | 5/2006 |
| WO | 2008/075766 A1 | | 6/2008 |

OTHER PUBLICATIONS

R. Andrews, D. Jacques, D. Qian, E.C. Dickey, Purification and structural annealing of multiwalled carbon nanotubes at graphitization temperatures, Carbon, vol. 39, Issue 11, Sep. 2001, pp. 1681-1687, ISSN 0008-6223, 10.1016/S0008-6223(00)00301-8. (http://www.sciencedirect.com/science/article/pii/S0008622300003018).*

* cited by examiner

*Primary Examiner* — Stuart Hendrickson
*Assistant Examiner* — Richard M Rump
(74) *Attorney, Agent, or Firm* — Sughrue Mion, PLLC

(57) ABSTRACT

A method for producing a carbon fiber, comprising a step of dissolving or dispersing [I] a compound containing Co element; [II] a compound containing at least one element selected from the group consisting of Ti, V, Cr, and Mn; and [III] a compound containing at least one element selected from the group consisting of W and Mo in a solvent to obtain a solution or a fluid dispersion, a step of impregnating a particulate carrier with the solution or the fluid dispersion to prepare a catalyst, and a step of bringing a carbon source into contact with the catalyst in a vapor phase.

9 Claims, No Drawings

METHOD FOR PRODUCING CARBON FIBER

This International application claims priority under 35 U.S.C. sect. 119(e) on U.S. Provisional Application No. 61/075,210 filed on Jun. 24, 2008 and under 35 U.S.C. sect. 119(a) on Patent Application No. 2008-159788 filed in Japan on Jun. 18, 2008, the entire contents of which are hereby incorporated by reference.

TECHNICAL FIELD

The present invention relates to a method for producing a carbon fiber. In more detail, the present invention relates to a method for producing a carbon fiber suitably used as a filler for improving electric conductivity, heat conductivity and the like by being added to a material such as metal, resin, ceramics and the like, as an electron emitting material for FED (Field Emission Display), as a catalyst carrier for various reactions, moreover as a medium for storing hydrogen, methane or like various gases, or as an electrode material of an electrochemical element such as a battery and a capacitor.

BACKGROUND ART

As a method for producing a carbon fiber, there is known that a method for growing a carbon fiber using a catalyst as a core, namely, a so-called chemical vapor deposition method (hereinafter referred to as CVD method). As the CVD method, a method in which a catalytic metal is supported on a carrier for use and a method in which an organic metal complex is thermally decomposed in a vapor phase so as to generate a catalyst without using a carrier (fluidized vapor phase method) are known.

As the carbon fiber obtained by the method of generating a catalyst in a vapor phase (fluidized vapor phase method), PTL 5 shows a carbon fiber having the total metal element content of 0.3 to 0.7% by mass and the transition metal element content of 0.1 to 0.2% obtained by a method (fluidized vapor phase method) in which an organic metal complex such as ferrocene and a carbon source such as benzene are fluidized, and the carbon source is thermally decomposed under a hydrogen atmosphere using a metal particle as a catalyst obtained by thermal decomposition of the metal complex. The carbon fiber obtained by this fluidized vapor phase method has many defects in a graphite layer and has a problem that without heat treatment at a high temperature, electric conductivity does not emerge even if being added to a resin or the like as filler. Thus, with the fluidized vapor phase method, it is difficult to inexpensively produce a carbon fiber having desired properties.

On the other hand, a method using a catalyst carrier is roughly divided into (1) a method using a platy substrate carrier; and (2) a method of using a particulate carrier. With the method (1) using a platy substrate carrier, since the size of the catalytic metal to be supported can be arbitrarily controlled by applying various film formation techniques, this method is usually used in laboratory demonstration of research. For example, NPL 1 discloses that using those in which an aluminum layer having thickness of 10 nm, an iron layer having thickness of 1 nm, and a molybdenum layer having thickness of 0.2 nm are generated on a silicon substrate can give a tube-like multiwall nanotube or a double-wall nanotube having a fiber diameter of approximately 10 to 20 nm. Also, PTL 4 discloses a catalyst by supporting a metal composed of a combination of Ni, Cr, Mo and Fe or a combination of Co, Cu, Fe and Al on a platy substrate carrier by a sputtering method or the like. And PTL 4 describes manufacture of a carbon fiber therewith. In order to use the carbon nanotube as filler obtained by this method using a platy substrate carrier to be added into a resin or the like, it is necessary to be separated from the substrate and collected. The carbon nanotube collected as the above substantially contains only catalytic metal component as impurities, but since generation efficiency of the carbon nanotube with respect to a catalyst mass is markedly low, the content of the catalytic metal component in the carbon nanotube is likely to be high. Moreover, if this method is to be industrially utilized, since a platy substrate surface area can not be ensured unless a number of substrates are arranged, not only that device efficiency is low but also many processes such as supporting of the catalytic metal on the substrate, synthesis of the carbon nanotube, collection of the carbon nanotube from the substrate and the like are needed, which is not economical, and industrial utilization has not been realized yet.

On the other hand, with the method (2) using the particulate cancer, since a specific surface area of the catalyst carrier is larger than that of the method using the substrate carrier, not only that the device efficiency is favorable but also a reactor used for various chemical synthesis can be applied, and this method has merits that realizes not only a production method based on batch processing such as the substrate method but also continuous reactions.

However, with the method using the particulate carrier, a catalyst carrier is unavoidably mixed in a carbon fiber product, and it is difficult to obtain a carbon fiber with high purity.

As a method for reducing the amount of impurities in the carbon fiber obtained by the method using the particulate carrier, (1) a method of heat treatment at a high temperature; and (2) a method of washing and removing with acid or base are known, but both of the methods have complicated processes and are not economical. Particularly, in the washing and removing of the impurities with acid or base, since the catalyst carrier and the catalytic metal in the carbon fiber are covered by a carbon overcoat in many cases, it is difficult to fully remove the impurities unless the carbon overcoat is removed by using an oxidizing acid such as nitric acid or by performing partial oxidization. If an oxidizing acid is used, not only the carbon overcoat on the surface of the carrier or the catalyst but also the carbon fiber itself might be damaged and become defective. The carbon fiber affected by an acid might have lowered electric conductivity or lowered heat conductivity, or dispersibility or filling performance into a resin or the like might be deteriorated.

Various catalysts for manufacturing a carbon fiber are proposed. For example, PTL 1 discloses a catalyst containing Fe element and at least one element selected from the group consisting of V, Nb, Ta, Cr, Mo, W, Mn, Tc, and Re. Specifically, the PTL 1 discloses that the catalyst is obtained by supporting a metal element composed of a combination of Fe and Mo, Fe and Cr, Fe and Ce, Fe and Mn or the like on a carrier using an impregnating method.

PTL 2 discloses a catalyst obtained by coprecipitation of a metal having fibril-forming catalytic properties composed of Fe or a combination of Fe and Mo and a carrier metal component such as Al, Mg and the like. It is disclosed that using this catalyst, a carbon fiber having the content of impurities from the catalytic metal of 1.1% by mass or less and the content of the impurities from the catalyst carrier of 5% by mass or less can be obtained.

PTL 3 discloses a catalyst obtained by coprecipitation of a catalytic metal component composed of a combination of Mn, Co, and Mo or a combination of Mn and Co and a carrier metal component such as Al, Mg and the like.

CITATION LIST

Patent Literature

[PTL 1] U.S. Pat. No. 5,707,916
[PTL 2] Japanese Patent Laid-Open No. 2003-205239
[PTL 3] International Publication No. WO2006/50903
[PTL 4] U.S. Pat. No. 6,518,218
[PTL 5] Japanese Patent Laid-Open No. 2001-80913

Non Patent Literature

[NPL 1] Chemical Physics Letters 374 (2003), 222-228

SUMMARY OF INVENTION

Technical Problem

However, in the manufacture method of the carbon fiber disclosed in PTL 1, temperature dependency of generation efficiency is high, and a data spread in impurity concentration is large. In the manufacture method of the carbon fiber with the catalyst obtained by the coprecipitation shown in PTL 2 and PTL 3, the generation efficiency is low and a cost is high. Also, the obtained carbon fibers have relatively low electric conductivity. In the method using the substrate carrier as described in PTL 4, since various film forming techniques that are sputtering method, CVD method and the like can be applied in order that the catalytic component may be brought into close contact with the substrate, and film thickness control and proportion control can be carried out with precision, which is suitable for research of carbon fiber in the laboratory. However, its generation efficiency is low, and it is not suitable for industrial applications. Also, if used as filler to be added to the resin, it needs to be separated from the substrate, which increases the number of processes. With the fluidized vapor phase method as described in PTL 5, a high-temperature reaction field at 1000 degrees cent. or above is required in general, and since the obtained carbon fiber contains a tar component and crystallinity of the carbon fiber itself is low, heat treatment is required as post-treatment, which raises a manufacturing cost.

As mentioned above, it has been difficult to obtain a carbon fiber which can give high heat conductivity and high electric conductivity when used as filler and contains a low content of impurities with a lower cost.

The present invention has an object to provide a method for efficiently producing a carbon fiber in which generation efficiency (weight gain) of the carbon fiber per catalyst mass is high, temperature dependency of the generation efficiency is low, a data spread in impurity concentration is small, electric conductivity and heat conductivity are high, and filling performance and dispersibility in a resin or the like is excellent.

Solution to Problem

As the result of keen researches by the inventors in order to achieve the above object, they have found out that by conducting a vapor phase growth reaction of carbon fiber using a catalyst obtained by dissolving or dispersing [I] a compound containing Co element, [II] a compound containing at least one element selected from the group consisting of Ti, V, Cr and Mn, and [III] a compound containing at least one element selected from the group consisting of W and Mo in a solvent to obtain a solution or a fluid dispersion; mixing the solution or the fluid dispersion with a particulate carrier and then drying the mixture; the generation efficiency (weight gain) of the carbon fiber per catalyst mass is high and the carbon fiber having a small total content of metal elements can be obtained. They have also found out that since the carbon fiber is excellent in filling performance and dispersibility in a resin or the like, high electric conductivity and high heat conductivity can be given. The present invention was completed as the result of further researches based on these findings.

That is, the present invention includes the following modes.

(1) A method for producing a carbon fiber comprising a step dissolving or dispersing [I] a compound containing Co element; [II] a compound containing at least one element selected from the group consisting of Ti, V, Cr, and Mn; and [III] a compound containing at least one element selected from the group consisting of W and Mo in a solvent to obtain a solution or a fluid dispersion, a step of impregnating a particulate carrier with the solution or the fluid dispersion to prepare a catalyst, and a step of bringing a carbon source into contact with the catalyst in a vapor phase.

(2) The method for producing a carbon fiber described in (1), in which a total amount of the element [I], the element [II], and the element [III] is 1 to 200% by mass with respect to the particulate carrier.

(3) The method for producing a carbon fiber described in (1) or (2), in which the carrier is alumina, magnesia, titania, silica, calcium carbonate, calcium hydroxide or calcium oxide.

(4) The method for producing a carbon fiber described in any one of (1) to (3), in which a temperature in the step of bringing the carbon source into contact with the catalyst in the vapor phase is 500 degrees cent. to 1000 degrees cent.

(5) The method for producing a carbon fiber described in any one of (1) to (4), further comprising a step of reduction treatment of the catalyst before the step of bringing the carbon source into contact with the catalyst in a vapor phase.

(6) A method for producing a composite material, comprising a step of dissolving or dispersing [I] a compound containing Co element; [II] a compound containing at least one element selected from the group consisting of Ti, V, Cr, and Mn; and [III] a compound containing at least one element selected from the group consisting of W and Mo in a solvent to obtain a solution or a fluid dispersion, a step of impregnating a particulate carrier with the solution or the fluid dispersion to prepare a catalyst, a step of bringing a carbon source into contact with the catalyst in a vapor phase to obtain a carbon fiber, and a step of kneading the carbon fiber and a resin.

Advantages Effects of Invention

According to the method for producing a carbon fiber in the present invention, since the generation efficiency (weight gain) of the carbon fiber per catalyst mass is high and the temperature dependency of the generation efficiency is low, the carbon fiber in which the content of the metal elements as impurities is small and a data spread of the impurity concentration is small can be obtained inexpensively with a simple process.

The carbon fiber obtained by the producing method in the present invention can be uniformly dispersed when filled in metal, resin, ceramics and the like, high heat conductivity and high electric conductivity can be given, and strength deterioration or the like of a composite material obtained by adding the carbon fiber in the metal, resin, ceramics and the like is not caused. Moreover, the carbon fiber obtained by the producing method in the present invention is suitably used as an electron emitting material for FED (Field Emission Display), as a catalyst carrier for various reactions, moreover as a medium for storing hydrogen, methane or like various gases, or as an electrode material of an electrochemical element such as a battery, a capacitor, a hybrid capacitor and the like.

DESCRIPTION OF EMBODIMENTS

The catalyst used in the method for producing carbon fiber in the present invention is prepared by dissolving or dispersing [I] a compound containing Co element; [II] a compound containing at least one element selected from the group consisting of Ti, V, Cr, and Mn; and [III] a compound containing at least one element selected from the group consisting of W and Mo in a solvent to obtain a solution or a fluid dispersion, and impregnating a particulate carrier with the solution or the fluid dispersion.

The element [I] is Co. Using of Co as a main component of a catalytic metal element is likely to give a carbon fiber with a small fluctuation in the impurity concentration, since a temperature dependency of generation efficiency in a catalyst using Co as a main component of a catalytic metal element smaller than that in a catalyst using Fe as a main component of the catalytic metal element.

The element [II] is at least one element selected from the group consisting of Ti, V, Cr, and Mn. In the elements [II], at least one element selected from the group consisting of Ti, V, and Cr is preferable, at least one element selected from the group consisting of Ti and V is more preferable, and V is particularly preferable from the viewpoint of the generation efficiency.

Since Cr includes a plurality of types with different oxidation numbers as divalent, trivalent and hexavalent and Mn includes oxidation numbers as divalent, tetravalent and heptavalent, control of the oxidation number in catalyst preparation is required, and a catalyst preparation process might become complicated, but Cr gives higher generation efficiency when a calcium carbonate carrier is used. Ti is stable with the oxidation number of tetravalent, and the abovementioned particular control is not needed and the catalyst performance is stable without using a complicated catalyst preparation method.

The element [III] is at least one element selected from the group consisting of W and Mo.

The compound containing the element [I], the compound containing the element [II], and the compound containing the element [III] are not particularly limited as long as they can be dissolved or dispersed in a solvent. For example, the compound containing the element [I] includes cobalt nitrate, cobalt chloride and the like. The compound containing the element [II] includes titanium chloride, ammonium metavanadate, chromium nitrate, titanium tetra-butoxide tetramer, manganese nitrate and the like. The compound containing the element [III] includes hexaanimonium heptamolybdate tetrahydrate, ammonium metatungstate hydrate and the like. These compounds may be either hydrate or anhydride.

Usages of the compound containing the element [I], the compound containing the element [II], and the compound containing the element [III] are adjusted as appropriate so that the element [I], the element [II], and the element [III] are contained in a desired ratio as catalytic metal elements. A combination of these three catalytic metal elements contained in the desired ratio gives higher generation efficiency (weight gain) of carbon fiber per catalyst mass and lower temperature dependency of the generation efficiency, which results in efficiently producing a carbon fiber with less impurity.

The combination of the catalytic metal elements in the present invention includes Co—Ti—Mo, Co—Mn—Mo, Co—V—Mo, Co—Cr—Mo, Co—Ti—W, Co—V—W, Co—Cr—W, and Co—Mn—W.

The preferable amount of the element [II] with respect to the element [I] is different depending on the element species. If the element [II] is Mn, the preferable amount of the element [II] with respect to the element [I] is 1 to 200% by mol, more preferably 10 to 150% by mol, or particularly preferably 50 to 150% by mol. If the element [II] is Ti, V or Cr, the preferable amount of the element [II] with respect to the element [I] is 1 to 100% by mol, more preferably 5 to 50% by mol, or particularly preferably 5 to 20% by mol.

The element [III] is preferably 1 to 100% by mol, more preferably 5 to 50% by mol, or still more preferably 5 to 20% by mol with respect to the element [I].

When each compound is selected so that the proportions of the element [I], the element [II] and the element [III] satisfy the above ranges respectively, a carbon fiber with less total metal element content can be likely obtained.

Moreover, if the element [II] is Mn, the total amount of the element [II] and the element [III] with respect to the element [I] is preferably not more than 150% by mol. If the element [II] is Ti, V or Cr, the total amount of the element [II] and the element [III] with respect to the element [I] is preferably not more than 30% by mol.

It is only necessary that a carrier used in the producing method of the present invention is stable in a vapor phase reaction temperature region, and inorganic oxides and inorganic carbonates are usually used. For example, alumina, zirconia, titania, magnesia, calcium carbonate, calcium hydroxide, calcium oxide, strontium oxide, barium oxide, zinc oxide, strontium carbonate, barium carbonate, silica, diatomite, zeolite and the like. Among them, from the viewpoint to lower the content of impurities, alumina, magnesia, titania, calcium carbonate, calcium hydroxide or calcium oxide is preferable. As alumina, intermediate alumina is preferably used. Also, from the viewpoint to improve heat conductivity, a compound containing calcium such as calcium carbonate, calcium hydroxide or calcium oxide is preferable. The carrier is preferably particulate.

The total supported amount of the element [I], the element [II] and the element [III] with respect to the carrier is preferably 1 to 200% by mass, more preferably 5 to 100% by mass, or still more preferably 5 to 70% by mass. If the supported amount is too large, a manufacturing cost rises and the total content of the metal elements in the carbon fiber tends to be high.

In the process of preparing a catalyst, a compound containing the element [I], a compound containing the element [II] and a compound containing the element [III] are dissolved or dispersed in a solvent to obtain a solution or a fluid dispersion, and the solution or fluid dispersion is mixed with a particulate carrier, and then the mixture is dried.

The catalytic metal elements may be supported on the carrier, by impregnating the particulate carrier with a liquid containing all of the compound containing the element [I], the compound containing the element [II], and the compound containing the element [III]; or by impregnating the particulate carrier with a liquid containing the compound containing the element [I], a liquid containing the compound containing the element [II], and a liquid containing the compound containing the element [III] in random order.

In order to improve dispersibility of the catalytic metal elements, a dispersing agent or surfactant (preferably cationic surfactant or anionic surfactant) may be added to the liquid containing the catalytic metal element. A catalytic metal element concentration in the liquid containing the catalytic metal element can be selected as appropriate according to the solvent, catalytic metal species and the like. The amount of the liquid containing the catalytic metal element to be mixed with the carrier preferably corresponds to a liquid absorbing amount of the carrier to be used.

The drying after the liquid containing the catalytic metal elements and the carrier are sufficiently mixed is preferably carried out at 70 to 150 degrees cent. Vacuum drying may be employed in the drying. Moreover, pulverization and classification are preferably performed after the drying in order to obtain an appropriate size.

The carbon source used in the producing method for a carbon fiber in the present invention is not particularly limited, but it includes an organic compound including alkanes such as methane, ethane, propane, butane, pentane, hexane, heptane, octane and the like; alkenes such as butene, isobutene, butadiene, ethylene, propylene and the like, alkynes such as acetylene; aromatic hydrocarbons such as benzene, toluene, xylene, styrene, naphthalene, anthracene, ethyl benzene, phenanthrene and the like; alcohols such as methanol, ethanol, propanol, butanol and the like; alicyclic hydrocarbons such as cyclopropane, cyclopentane, cyclohexane, cyclopentene, cyclohexene, cyclopentadiene, dicyclopentadiene and the like; cumene, formaldehyde, acetaldehyde, acetone and the like; and carbon monoxide, carbon dioxide and the like. They can be used alone or in combination of two or more. Also, benzine, kerosene and the like can also be used as the carbon source. Among them, methane, ethane, ethylene, acetylene, benzene, toluene, methanol, ethanol and carbon monoxide are preferable, and methane, ethane and ethylene are particularly preferable.

A method of bringing the catalyst and the carbon source into contact with each other in a vapor phase can be performed by the same manner as the conventional known vapor phase methods.

For example, there is a method in which the catalyst is set in a vertical-type or horizontal-type reactor heated to a predetermined temperature and the carbon source is fed with a carrier gas into the reactor.

The catalyst may be set in a fixed-bed reactor in which it is placed on a boat (a boat made of quartz, for example) in the reactor or may be set in a fluidized-bed reactor in which it is fluidized by the carrier gas in the reactor. Since the catalyst might be in an oxidized state, the catalyst can be reduced by feeding a gas containing a reducing gas before the carbon source is fed. A temperature at the reduction is preferably 300 to 1000 degrees cent., or more preferably 500 to 700 degrees cent., and a reduction time is preferably 10 minutes to 5 hours, or more preferably 10 to 60 minutes.

As the carrier gas, a reducing gas such as a hydrogen gas is preferably used. The amount of the carrier gas can be selected as appropriate according to a reaction mode but it is preferably 0.1 to 70 parts by mol with respect to 1 part by mol of the carbon source. Other than the reducing gas, an inactive gas such as nitrogen gas, helium gas, argon gas and the like may be used at the same time. Also, the relative proportions of the gas may be changed during progress of the reaction. A reducing gas concentration is preferably not less than 1% by volume, more preferably not less than 30% by volume, or particularly preferably not less than 85% by volume with respect to the entire carrier gas.

A reaction temperature in the vapor phase growth is preferably 500 to 1000 degrees cent., or more preferably 550 to 750 degrees cent. Within this temperature range can easily produce a tube-like carbon fiber with a multilayer structure composed of a portion in which graphite layers are regularly arrayed in a straight line state and a portion in which they are arrayed irregularly.

The carbon fiber obtained by the above method may be subject to heat treatment at 2000 to 3500 degrees cent. under an inactive gas atmosphere of helium, argon and the like. The heat treatment may be performed at a high temperature of 2000 to 3500 degrees cent. from the beginning, or the temperature may be raised in step by step. The heat treatment in stepwise temperature rise is performed in a first stage of usually 800 to 1500 degrees cent. and in a second stage of usually 2000 to 3500 degrees cent.

The carbon fiber obtained by the producing method in the present invention has the content of the element [I] to the carbon fiber preferably of 2% by mass or less, more preferably of 1.3% by mass or less, still more preferably 0.8% by mass or less, or particularly preferably 0.4% by mass or less. If the element [II] contained in the carbon fiber is Mn, the content of the element [II] to the carbon fiber preferably is 2% by mass or less, more preferably of 1.3% by mass or less, still more preferably 0.8% by mass or less, or particularly preferably 0.4% by mass or less. If the element [II] contained in the carbon fiber is Ti, V or Cr, the content of the element [II] (excluding the metal elements derived from the carrier) to the carbon fiber is preferably 0.4% by mass or less, more preferably 0.25% by mass or less, still more preferably 0.15% by mass or less, or particularly preferably 0.08% by mass or less. The content of the element [III] to the carbon fiber is preferably 0.4% by mass or less, more preferably 0.25% by mass or less, still more preferably 0.15% by mass or less, or particularly preferably 0.08% by mass or less.

The carbon fiber obtained by the producing method in the present invention may contain a metal element derived from the catalyst carrier. For example, the element includes Al derived from alumina or the like, Zr derived from zirconia or the like, Ti derived from titania or the like, Mg derived from magnesia or the like, Ca derived from calcium carbonate, calcium oxide, calcium hydroxide and the like, Si derived from silica, diatomite and the like or so on.

The metal elements derived from these catalyst carriers may be contained preferably in 0.1 to 20 times, more preferably 0.1 to 10 times, or particularly preferably 0.1 to 5 times, with respect to the total mass of the element [I], the element [II] and the element [III] derived from the catalytic metal. The content of the metal element derived from the carrier in the carbon fiber are preferably 5% by mass or less, more preferably 3% by mass or less, still more preferably 2% by mass or less, or particularly preferably 1% by mass or less.

The carbon fiber obtained by the producing method in the present invention has the metal elements total content of preferably 10% by mass or less, more preferably 5% by mass or less, still more preferably 3% by mass or less, or particularly preferably 2% by mass or less. Here, the total metal element content is the total amount of the element [I], the element [II] and the element [III] derived from the catalytic metal and the metal element derived from the carrier.

The total content of the element [I], the element [II] and the element [III] derived from the catalytic metal is preferably 4.4% by mass or less, more preferably 2.9% by mass or less, still more preferably 1.8% by mass or less, or particularly preferably 0.9% by mass or less, if the element [II] is Mn. If the element [II] is Ti, V or Cr, the total content of the element [I], the element [II] and the element [III] derived from the catalytic metal is preferably 2.8% by mass or less, more preferably 1.8% by mass or less, still more preferably 1.1% by mass or less, or particularly preferably 0.6% by mass or less.
The contents of these metal elements in the carbon fiber can be determined by measuring the solution obtained by sulfuric nitric acid—decomposition of the carbon fiber using ICP-AES (Inductively Coupled Plasma-Atomic Emission Spectrometry).

Since the carbon fiber obtained by the producing method in the present invention has a low impurity content and excellent dispersibility when being filled in a resin or the like, heat conductivity and electric conductivity of the resin or the like can be drastically improved. Also, deterioration of mechanical strength of the resin or the like can be restrained even if the carbon fiber of the present invention is added in a large quantity.

The carbon fiber obtained by the producing method in the present invention is preferably not more than 0.9, or more preferably not more than 0.7 in R value in Raman spectroscopic analysis.

The R value is an intensity ratio $I_D/I_G$ between peak intensity ($I_D$) in the vicinity of 1360 $cm^{-1}$ and the peak intensity ($I_G$) in the vicinity of 1580 $cm^{-1}$ measured by Raman spectroscopic spectrum. The R value was determined under a condition of excitation wavelength of 532 nm using Series 5000 made by Kaiser Optical Systems, Inc. The smaller R value indicates the larger growth level of the graphite layer in the carbon fiber. If the R value satisfies the above range, the heat conductivity and electric conductivity of the resin or the like can be raised when the fiber is added to the resin or the like.

The carbon fiber obtained by the producing method in the present invention has a fiber diameter preferably of 5 nm or more and 100 nm or less, more preferably of 5 nm or more and 70 nm or less, or particularly preferably of 5 nm or more and 50 nm or less. Its aspect ratio is preferably 5 to 1000.

In a preferred embodiment of the carbon fiber obtained by the producing method in the present invention, the graphite layer extends approximately in parallel with a fiber axis. The term "approximately parallel" in the present invention means that an inclination angle of the graphite layer to the fiber axis is within a range of approximately plus or minus 15 degrees.

A length of the graphite layer is preferably 0.02 times or more and 15 times or less as long as the fiber diameter. The shorter the length of the graphite layer is, the higher the contact strength between the carbon fiber and the resin becomes when being filled in the resin or the like, and the mechanical strength of a composite of the resin and the carbon fiber becomes higher. The length of the graphite layer and the inclination angle of the graphite layer can be determined by observation using an electronic microscope photographs and the like.

The carbon fiber obtained by the producing method in the present invention is preferably 30% or more and 90% or less in a ratio of the number of graphite layers being less than twice as long as the fiber diameter.

Also, the preferred embodiment of the carbon fiber is in a tube state having a hollow at the center part of the fiber. The hollow part may be continuous in the fiber longitudinal direction or may be discontinuous. A ratio ($d_0/d$) between a fiber diameter d and a hollow inner diameter $d_0$ is not particularly limited but it is preferably 0.1 to 0.8, or more preferably 0.1 to 0.6.

The tube-like carbon fiber obtained by the producing method in the present invention is preferably has a shell with a multilayer structure surrounding the hollow. For example, it includes those with an inner layer of the shell composed of a crystalline carbon and an outer layer of the shell composed of a carbon containing a thermal de-composition layer; and those with a portion where the graphite layers are arrayed regularly in parallel and a portion where the graphite layers are arrayed irregularly at random.

The former carbon fiber with the shell inner layer composed of the crystalline carbon and the shell outer layer composed of the carbon containing the thermal decomposition layer has a higher contact strength between the carbon fiber and the resin when being filled in the resin or the like, and the mechanical strength of the composite of the resin and the carbon fiber becomes higher.

With the carbon fiber with the portion where the graphite layers are arrayed regularly in parallel and the portion where the graphite layers are arrayed irregularly at random, if the layer made up of the irregular carbon atom array is thick, fiber strength might easily become weak, while if the layer made up of the irregular carbon atom array is thin, interface strength with the resin might easily become weak. In order to enhance the fiber strength and the interface strength with the resin, it is preferable that the layer made up of the irregular carbon atom array (irregular graphite layer) is present with an appropriate thickness or that a thick irregular graphite layer and a thin irregular graphite layer are mixed or distributed in a single fiber.

The carbon fiber obtained by the producing method in the present invention has its specific surface area preferably of 20 to 400 $m^2/g$, more preferably of 30 to 350 $m^2/g$, or particularly preferably 40 to 350 $m^2/g$. The specific surface area can be determined by the BET method in nitrogen adsorption.

Since the carbon fiber obtained by the producing method in the present invention is excellent in dispersibility into matrix such as resin, metal, ceramics and the like, by having the carbon fiber contained in the resin or the like, a composite material having high electric conductivity or high heat conductivity can be obtained. Particularly if the fiber is mixed in the resin to have a composite material, an excellent effect that the equivalent conductivity is shown with the added amount of the carbon fiber in the present invention being ½ to ⅓ by mass or less as that of a conventional carbon fiber is exerted. Specifically, in the resin-carbon fiber composite material used for application with antistatic properties or the like, desired conductivity or the like could not be obtained unless 5 to 15% by mass of the conventional carbon fiber has been contained. On the other hand, by using the carbon fiber obtained by the producing method in the present invention, sufficient conductivity can be obtained by mixing of 0.1 to 8% by mass. If it is mixed with metal, fracture strength can be improved. The reason why the carbon fiber obtained by the producing method in the present invention shows excellent dispersibility to the matrix is not known, but it is assumed that the thermal decomposition of the carbon source is appropriately promoted in the vapor phase, and a thermal decomposition layer with an appropriate thickness is formed on the surface of the fiber.

The ceramics to which the carbon fiber obtained by the producing method in the present invention is added includes aluminum oxide, mullite, silicon oxide, zirconium oxide, silicon carbide, silicon nitride and the like.

The metal to which the carbon fiber obtained by the producing method in the present invention is added includes gold, silver, aluminum, iron, magnesium, lead, copper, tungsten, titanium, niobium, hafnium as well as their alloys and mixtures.

As the resin to which the carbon fiber obtained by the producing method in the present invention is added, either of thermoplastic resin and thermosetting resin can be employed. For further improvement of impact resistance, a resin in which thermoplastic elastomer or rubber component is added to the above thermoplastic resin can be employed.

In a resin composition in which the carbon fiber obtained by the producing method in the present invention is dispersed, other various resin additives can be compounded within a range not impairing the performance and function of the resin composition. The resin additives include, for example, coloring agent, plasticizer, lubricant, heat stabilizer, light stabilizer, ultraviolet absorber, filler, foaming agent, flame retarder, rust-preventive agent and the like. These various resin additives are preferably compounded in the final process when the resin composition is prepared.

When each component constituting the resin composition in which the carbon fiber obtained by the producing method in the present invention is dispersed is mixed and kneaded, fracture of the carbon fiber is preferably restrained as much as possible. Specifically, a fracture ratio of the carbon fiber is preferably kept at 20% or less, more preferably at 15% or less, or particularly preferably at 10% or less. The fracture ratio is determined by comparing the aspect ratio of the carbon fiber before and after the mixing and kneading as measured by electronic microscope SEM observation, for example. In order to mix and knead while suppressing the fracture of the carbon fiber as much as possible, the following method can be used, for example.

In general, if inorganic filler is kneaded in the molten thermoplastic resin or thermosetting resin, high shear is applied to the aggregated inorganic filler so as to be unraveled and be dissected out, and to evenly disperse the inorganic filler in the molten resin. If the shear in kneading is weak, the inorganic filler is not sufficiently dispersed in the molten resin, and a resin composite material having expected performance and function can not be obtained. As a kneading machine capable of generating a high shearing force, those using a millstone mechanism or employing a kneading disk capable of applying high shear in a screw element of a same-direction twin-screw extruder is used in many cases. However, if the carbon fiber is kneaded in the resin, if excessively high shear is applied to the resin or carbon fiber, the carbon fiber might be fractured, and the resin composite material having expected performance and function can not be obtained. On the other hand, in the case of a single-screw extruder with weak shearing force, the fracture of the carbon fiber can be suppressed, but dispersion of the carbon fiber does not become even.

Therefore, in order to realize even dispersion while suppressing the fracture of the carbon fiber, kneading with reduced shear with the same-direction twin-screw extruder not using the kneading disk, kneading for a long time with a device such as a pressurized kneader which does not apply high shear or kneading with using a special mixing element in the single-screw extruder is preferable.

Also, in order to disperse the carbon fiber in the resin, wettability between the molten resin and the carbon fiber is important. By improving the wettability, an area corresponding to an interface between the molten resin and the carbon fiber is increased. As a method of increasing the wettability, there is a method of oxidation treatment of the surface on the carbon fiber, for example.

Since the carbon fiber obtained by the producing method in the present invention might easily suck in air, deaeration is difficult with a regular single-screw extruder or same-direction twin-screw extruder, and it might be difficult to fill the fiber in the resin. Thus, as a kneading machine with favorable filling performance and can restrain fracture of the carbon fiber as much as possible, a batch-type pressurized kneader is preferable. Those kneaded by the batch-type pressurized kneader can be inputted into a single-screw extruder before solidification to be made into a pellet. Other than that, as an extruder capable of deaeration of the carbon fiber containing much air and high filling thereof, a reciprocally-moving single-screw extruder (Co-kneader made by Coperion Bus AG) can be used.

The composite material filled with the carbon fiber obtained by the producing method in the present invention can be suitably used as a molding material to obtain products and components requiring impact resistance as well as conductivity and antistatic properties such as components used in OA equipment and electronic equipment, conductive packaging components, components for antistatic packaging, automobile components and the like. More specifically, the composite material can be used for a seamless belt being excellent in durability, heat resistance, surface smoothness as well as stable electric resistance properties used in a photoreceptor, charge belt, transfer belt, fixation belt and the like in an image forming device such as an electronic photocopier, laser printer and the like; a tray and a cassette being excellent in heat resistance, antistatic properties and the like for machining, washing, transfer, storage and the like of a hard disk, hard disk head, or various semiconductor components in a manufacturing, transport, or storage process; and for an automobile components for electrostatic coating and a fuel tube for automobile. Since the carbon fiber obtained by the producing method in the present invention has extremely small metal impurities derived from the catalyst, if the hard disk, hard disk head, or various semiconductors are transported by the tray and the cassette manufactured using the composite material containing the carbon fiber, contamination on them caused by a metal ion or the like becomes extremely rare.

When these products are to be manufactured, a known molding method of a resin composition can be used. The molding method includes injection molding, hollow molding, extrusion molding, sheet molding, thermoforming, rotational molding, laminated molding, transfer molding and the like.

Applications of the carbon fiber obtained by the producing method in the present invention can be extended to the aerospace field, sports field, industrial material field and the like. In the aerospace field, aircraft primary structural materials such as main plane, rear plane, fuselage and the like; aircraft secondary structural materials such as aileron, rudder, elevator and the like; aircraft interior materials such as floor panel, beam, lavatory, seat and the like; nozzle cone and motor case of a rocket; and antenna, solar battery panel, tube truss structural material of an artificial satellite and the like can be mentioned. In the sports field, fishing rod, reel of fishing goods; shaft, head, face plate, shoes for golf; racket for tennis, badminton, squash; frame, wheel, handle of a bicycle; yacht, cruiser, boat, mast; baseball bat, ski, ski stock, bamboo sword of Kendo, Japanese archery, archery, radio control car, table tennis, billiard, stick for ice hockey and the like can be cited. In the industrial material field, propeller shaft of automobile, racing car, CNG tank, spoiler, bonnet; cowl, muffler cover of motorcycle; railway car, linear motor car, seat; fiber components, mechanical components such as plate spring, robot arm, bearing, gear, cam, bearing retainer and the like; high-speed rotating body such as centrifugal separator rotor, uranium condensation cylinder, flywheel, industrial roller, shaft and the like; electronic and electric appliance component such as parabola antenna, acoustic speaker, VTR component, CD component, IC carrier, electronic device housing and the like; electrode for electro-chemical element such as battery (lithium ion battery or the like), capacitor (electric double-layer capacitor, hybrid capacitor and the like) and the like;

blade and nacelle of wind power generation; pressure vessel such as hydraulic cylinder, canister and the like; subsea oilfield excavator such as riser, tether and the like; chemical device such as agitation blade, pipe, tank and the like; medical equipment such as wheelchair, components for surgical operation, X-ray grid, cassette; civil engineering and construction material such as cable, concrete reinforcing material and the like; office equipment such as bearing, cam, housing and the like of printer; precision equipment such as camera component, plant component and the like; anti-corrosion device such as pump component; and other materials such as conductive material, insulating material, sliding material, heat-resistant material, charge sheet, resin die, umbrella, helmet, planar heat generator, eyeglass frame, anti-corrosion filter and the like can be cited.

Examples of the present invention will be illustrated below and the present invention will be described in more detail. They are mere illustrations for the sake of explanation, and the present invention is not limited by them at all.

Properties and the like were determined by the following methods.

(Content of Impurities)

The content of impurities was measured using a CCD multi-element simultaneous type ICP emission spectrophotometer (made by Varian Inc.: VISTA-PRO) at high-frequency output of 1200 W and measurement time of 5 seconds.

In a quartz beaker, 0.1 g of carbon fiber was precisely weighed and subjected to sulfuric nitric acid decomposition. After cooling, it was measured off in a volume of 50 ml. This solution was diluted as appropriate, and each element was quantified by ICP-AES (Atomic Emission Spectrometer). Mass ratio of the impurities to the mass of the carbon fiber is shown in Table. The "total metal element" in the Table refers to the total of metal elements derived from the catalyst carrier, and the element [I], the element [II] and the element [III] derived from the catalytic metal, the "element [I]+[II]+[III]" in the Table refers to the total of element [I], the element [II], and the element [III] derived from the catalytic metal, and the "carrier" in the Table refers to the amount of the metal element derived from the catalyst carrier.

(Resin Dispersibility)

Using a twin-screw extruder with a screw diameter of 30 mm (Japan Steel Works, Ltd., TEX 30 alfa), 5 parts by mass of the carbon fiber and 95 parts by mass of polycarbonate resin (made by Mitsubishi Engineering Plastics Corporation, Iupilon S3000) were kneaded at a temperature of 270 degrees cent. under a condition of screw rotation number of 80 rpm. Extrusion molding was performed using a dice with three holes of 5 mm phi so as to obtain a rod of 5 mm phi*150 mm. The surface of the rod was touched by hand, and feeling of irregularity was evaluated.

S: Smooth
C: Coarse (Weight Gain)

This is represented by a ratio of the mass of the generated carbon fiber to the mass of the used catalyst (mass of carbon fiber/mass of catalyst).

EXAMPLE 1

(Co(100)–Ti(10)–Mo(10)/magnesia)

In 0.9 part by mass of methanol, 1.24 parts by mass of cobalt (II) nitrate hexahydrate was added and dissolved, and 0.3 part by mass of nitric acid 70% solution was added. Then, 0.10 part by mass of titanium (IV) tetra-n-butoxide tetramer was added and dissolved so as to obtain a solution A.

The solution A was dripped and mixed with 1 part by mass of magnesia (made by Ube Material Industries, Ltd.; 500 A). After the mixing, it was vacuum-dried at 100 degrees cent. for 4 hours. After the drying, it was crushed in a mortar and pestle so as to obtain a powder A.

In 0.9 part by mass of water, 0.075 part by mass of hexaammonium heptamolybdate tetrahydrate was added and dissolved so as to obtain a solution B.

The solution B was dripped and mixed with the powder A. After the mixing, it was vacuum-dried at 100 degrees cent. for 4 hours. After the drying, it was crushed in a mortar and pestle so as to obtain a catalyst.

The catalyst contained 10% by mol of Mo and 10% by mol of Ti with respect to Co, and 25% by mass of Co was supported on magnesia.

The weighed catalyst was placed on a quartz boat, and the quartz boat was put in a tubular reactor made by quartz and the reactor was sealed. Inside the reactor was replaced by nitrogen gas, and while the nitrogen gas was made to flow, the temperature of the reactor was raised from the room temperature to 690 degrees cent. for 60 minutes. The temperature of 690 degrees cent. was maintained for 30 minutes while the nitrogen gas was made to flow.

While the temperature of 690 degrees cent. was maintained, the nitrogen gas was switched to a mixed gas A of nitrogen gas (100 parts by volume) and hydrogen gas (400 parts by volume), and the mixed gas A was made to flow through the reactor for 30 minutes to conduct reduction reaction. After the reduction reaction, while the temperature of 690 degrees cent. was maintained, the mixed gas A was switched to a mixed gas B of hydrogen gas (250 parts by volume) and ethylene gas (250 parts by volume), and the mixed gas B was made to flow through the reactor for 60 minutes to conduct vapor phase growth reaction. The mixed gas B was switched to the nitrogen gas, the inside of the reactor was replaced by the nitrogen gas, and the temperature was decreased to the room temperature. The reactor was opened, and the quartz boat was taken out. A carbon fiber grown with the catalyst as a core was obtained. The carbon fiber was tubular, and its shell was in a multi-walled structure. The evaluation result of the carbon fiber is shown in Table 1. The relative proportions of the metal elements contained in the carbon fiber were the same as those of the catalyst.

EXAMPLE 2

(Co(100)–V(10)–Mo(10)/magnesia)

In 0.9 part by mass of methanol, 1.24 parts by mass of cobalt (II) nitrate hexahydrate was added and dissolved, and then 0.3 part by mass of nitric acid 70% solution was added. Then, 0.050 part by mass of ammonium metavanadate and 0.075 part by mass of hexaammonium heptamolybdate tetrahydrate were added and dissolved so as to obtain a solution.

The solution was dripped and mixed with 1 part by mass of magnesia (made by Ube Material Industries, Ltd.; 500 A), After the mixing, it was vacuum-dried at 100 degrees cent. for 4 hours. After the drying, it was crushed in a mortar and pestle so as to obtain a catalyst.

The catalyst contained 10% by mol of Mo and 10% by mol of V with respect to Co, and 25% by mass of Co was supported on magnesia.

Using the catalyst, a carbon fiber was obtained by the same manner as in the Example 1. The carbon fiber was tubular, and its shell was in a multi-walled structure. The evaluation result of the carbon fiber is shown in Table 1. The relative proportions of the metal elements contained in the carbon fiber were the same as those of the catalyst.

EXAMPLE 3

(Co(100)-Cr(10)-Mo(10)/magnesia)

In 1.2 parts by mass of water, 1.24 parts by mass of cobalt (II) nitrate hexahydrate was added and dissolved, and then 0.170 part by mass of chromium (III) nitrate non-ahydrate and 0.075 part by mass of hexaammonium heptamolybdate tetrahydrate were added and dissolved so as to obtain a solution.

The solution was dripped and mixed with 1 part by mass of magnesia (made by Ube Material Industries, Ltd.; 500 A). After the mixing, it was vacuum-dried at 100 degrees cent. for 4 hours. After the drying, it was crushed in a mortar and pestle so as to obtain a catalyst.

The catalyst contained 10% by mol of Mo and 10% by mol of Cr with respect to Co, and 25% by mass of Co was supported on magnesia.

Using the catalyst, a carbon fiber was obtained by the same manner as in the Example 1. The carbon fiber was tubular, and its shell was in a multi-walled structure. The evaluation result of the carbon fiber is shown in Table 1. The relative proportions of the metal elements contained in the carbon fiber were the same as those of the catalyst.

EXAMPLE 4

(Co(100)-Mn(60)-Mo(10)/magnesia)

In 1.2 parts by mass of water, 1.24 parts by mass of cobalt (II) nitrate hexahydrate was added and dissolved, and then 0.73 part by mass of manganese (II) nitrate hexahydrate and 0.075 part by mass of hexaammonium heptamolybdate tetrahydrate were added and dissolved so as to obtain a solution.

The solution was dripped and mixed with 1 part by mass of magnesia (made by Ube Material Industries, Ltd.; 500 A). After the mixing, it was vacuum-dried at 100 degrees cent. for 4 hours. After the drying, it was crushed in a mortar and pestle so as to obtain a catalyst.

The catalyst contained 10% by mol of Mo and 60% by mol of Mn with respect to Co, and 25% by mass of Co was supported on magnesia.

Using the catalyst, a carbon fiber was obtained by the same manner as in the Example 1. The carbon fiber was tubular, and its shell was in a multi-walled structure. The evaluation result of the carbon fiber is shown in Table 1. The relative proportions of the metal elements contained in the carbon fiber were the same as those of the catalyst.

COMPARATIVE EXAMPLE 1

(Co(100)-Mo(10)/magnesia)

In 1.2 parts by mass of water, 1.24 parts by mass of cobalt (II) nitrate hexahydrate was added and dissolved, and then 0.075 part by mass of hexaammonium heptamolybdate tetrahydrate was added and dissolved so as to obtain a solution.

The solution was dripped and mixed with 1 part by mass of magnesia (made by Ube Material Industries, Ltd.; 500 A). After the mixing, it was vacuum-dried at 100 degrees cent. for 4 hours. After the drying, it was crushed in a mortar and pestle so as to obtain a catalyst.

The catalyst contained 10% by mol of Mo with respect to Co, and 25% by mass of Co was supported on magnesia.

Using the catalyst, a carbon fiber was obtained by the same manner as in the Example 1. The evaluation result is shown in Table 1. The relative proportions of the metal elements contained in the carbon fiber were the same as those of the catalyst.

TABLE 1

|  | Example | | | | Comp. Ex. |
|---|---|---|---|---|---|
|  | 1 | 2 | 3 | 4 | 1 |
| Element [I] | Co | Co | Co | Co | Co |
| Element [II] | Ti | V | Cr | Mn | — |
| Element [III] | Mo | Mo | Mo | Mo | Mo |
| Carrier | Magnesia | Magnesia | Magnesia | Magnesia | Magnesia |
| Proportions |  |  |  |  |  |
| [II]/[I] (mol %) | 10 | 10 | 10 | 60 | 0 |
| [III]/[I] (mol %) | 10 | 10 | 10 | 10 | 10 |
| [I]/carrier mass(wt %) | 25 | 25 | 25 | 25 | 25 |
| Reaction temperature (° C.) | 690 | 690 | 690 | 690 | 690 |
| Weight gain (times) | 18 | 31 | 25 | 26 | 17 |
| Content of Impurities |  |  |  |  |  |
| Total metal element (wt %) | 3.0 | 2.0 | 2.4 | 2.6 | 3.2 |
| Element [I] + [II] + [III] (wt %) | 1.0 | 0.7 | 0.8 | 1.0 | 1.1 |
| Carrier (wt %) | 2.0 | 1.3 | 1.6 | 1.6 | 2.1 |
| Resin dispersibility | S | S | S | S | C |

EXAMPLE 5

(Co(100)-Ti(10)-W(10)/magnesia)

In 0.9 part by mass of methanol, 1.24 parts by mass of cobalt (II) nitrate hexahydrate was added and dissolved, and then 0.3 part by mass of nitric acid 70% solution was added. Then, 0.10 part by mass of ammonium metatungstate hydrate and 0.10 part by mass of titanium (IV) tetra-n-butoxide tetramer were added and dissolved so as to obtain a solution.

The solution was dripped and mixed with 1 part by mass of magnesia (made by Ube Material Industries, Ltd.; 500 A). After the mixing, it was vacuum-dried at 100 degrees cent. for 4 hours. After the drying, it was crushed in a mortar and pestle so as to obtain a catalyst.

The catalyst contained 10% by mol of Ti and 10% by mol of W with respect to Co, and 25% by mass of Co was supported on magnesia.

Using the catalyst, a carbon fiber was obtained by the same manner as in the Example 1. The carbon fiber was tubular, and its shell was in a multi-walled structure. The evaluation result is shown in Table 2. The relative proportions of the metal elements contained in the carbon fiber were the same as those of the catalyst.

EXAMPLE 6

(Co(100)-V(10)-W(10)/magnesia)

In 0.9 part by mass of methanol, 1.24 parts by mass of cobalt (II) nitrate hexahydrate was added and dissolved, and then 0.3 part by mass of nitric acid 70% solution was added. Then, 0.050 part by mass of ammonium metavanadate and 0.10 part by mass of ammonium metatungstate hydrate were added and dissolved so as to obtain a solution.

The solution was dripped and mixed with 1 part by mass of magnesia (made by Ube Material Industries, Ltd.; 500 A).

After the mixing, it was vacuum-dried at 100 degrees cent. for 4 hours. After the drying, it was crushed in a mortar and pestle so as to obtain a catalyst.

The catalyst contained 10% by mol of W and 10% by mol of V with respect to Co, and 25% by mass of Co was supported on magnesia.

Using the catalyst, a carbon fiber was obtained by the same manner as in the Example 1. The carbon fiber was tubular, and its shell was in a multi-walled structure. The evaluation result is shown in Table 2. The relative proportions of the metal elements contained in the carbon fiber were the same as those of the catalyst.

EXAMPLE 7

(Co(100)–Cr(10)–W(10)/magnesia)

In 1.2 parts by mass of water, 1.24 parts by mass of cobalt (II) nitrate hexahydrate was added and dissolved, and then 0.170 part by mass of chromium (III) nitrate non-ahydrate and 0.10 part by mass of ammonium metatungstate hydrate were added and dissolved so as to obtain a solution.

The solution was dripped and mixed with 1 part by mass of magnesia (made by Ube Material Industries, Ltd.; 500 A). After the mixing, it was vacuum-dried at 100 degrees cent. for 4 hours. After the drying, it was crushed in a mortar and pestle so as to obtain a catalyst.

The catalyst contained 10% by mol of Cr and 10% by mol of W with respect to Co, and 25% by mass of Co was supported on magnesia.
Using the catalyst, a carbon fiber was obtained by the same manner as in the Example 1. The carbon fiber was tubular, and its shell was in a multi-walled structure. The evaluation result is shown in Table 2. The relative proportions of the metal elements contained in the carbon fiber were the same as those of the catalyst.

EXAMPLE 8

(Co(100)–Mn(120)–W(10)/magnesia)

In 1.2 parts by mass of water, 1.24 parts by mass of cobalt (II) nitrate hexahydrate was added and dissolved, and then 1.46 parts by mass of manganese (II) nitrate hexahydrate and 0.10 part by mass of ammonium metatungstate hydrate were added and dissolved so as to obtain a solution.

The solution was dripped and mixed with 1 part by mass of magnesia (made by Ube Material Industries Ltd.; 500 A). After the mixing, it was vacuum-dried at 100 degrees cent. for 4 hours. After the drying, it was crushed in a mortar and pestle so as to obtain a catalyst.

The catalyst contained 120% by mol of Mn and 10% by mol of W with respect to Co, and 25% by mass of Co was supported on magnesia.

Using the catalyst, a carbon fiber was obtained by the same manner as in the Example 1. The carbon fiber was tubular, and its shell was in a multi-walled structure. The evaluation result is shown in Table 2. The relative proportions of the metal elements contained in the carbon fiber were the same as those of the catalyst.

COMPARATIVE EXAMPLE 2

(Co(100)–W(10)/magnesia)

In 1.2 parts by mass of water, 1.24 parts by mass of cobalt (II) nitrate hexahydrate was added and dissolved, and then 0.10 part by mass of ammonium metatungstate hydrate was added and dissolved so as to obtain a solution.

The solution was dripped and mixed with 1 part by mass of magnesia (made by Ube Material Industries Ltd.; 500 A). After the mixing, it was vacuum-dried at 100 degrees cent. for 4 hours. After the drying, it was crushed in a mortar and pestle so as to obtain a catalyst.

The catalyst contained 10% by mol of W with respect to Co, and 25% by mass of Co was supported on magnesia.

Using the catalyst, a carbon fiber was obtained by the same manner as in the Example 1. The evaluation result is shown in Table 2. The relative proportions of the metal elements contained in the carbon fiber were the same as those of the catalyst.

TABLE 2

|  | Example | | | | Comp. Ex. |
| --- | --- | --- | --- | --- | --- |
|  | 5 | 6 | 7 | 8 | 2 |
| Element [I] | Co | Co | Co | Co | Co |
| Element [II] | Ti | V | Cr | Mn | — |
| Element [III] | W | W | W | W | W |
| Carrier | Magnesia | Magnesia | Magnesia | Magnesia | Magnesia |
| Proportions |  |  |  |  |  |
| [II]/[I] (mol %) | 10 | 10 | 10 | 120 | 0 |
| [III]/[I] (mol %) | 10 | 10 | 10 | 10 | 10 |
| [I]/carrier mass(wt %) | 25 | 25 | 25 | 25 | 25 |
| Reaction temperature (° C.) | 690 | 690 | 690 | 690 | 690 |
| Weight gain (times) | 10 | 14 | 9 | 24 | 8 |
| Content of Impurities |  |  |  |  |  |
| Total metal element (wt %) | 5.7 | 4.1 | 6.3 | 3.0 | 7.0 |
| Element [I] + [II] + [III] (wt %) | 2.1 | 1.5 | 2.3 | 1.5 | 2.5 |
| Carrier (wt %) | 3.6 | 2.6 | 4.0 | 1.5 | 4.5 |
| Resin dispersibility | S | S | S | S | C |

COMPARATIVE EXAMPLE 3

(Fe(10)–Co(100)/magnesia)

In 0.9 part by mass of methanol, 1.24 parts by mass of cobalt (II) nitrate hexahydrate was added and dissolved, and then 0.18 part by mass of iron (III) nitrate nonahydrate was added and dissolved so as to obtain a solution. The solution was dripped and mixed with 1 part by mass of magnesia (made by Ube Material Industries Ltd.; 500 A). After the mixing, it was vacuum-dried at 100 degrees cent. for 4 hours. After the drying, it was crushed in a mortar and pestle so as to obtain a catalyst. The catalyst contained 10% by mol of Fe with respect to Co, and 25% by mass of Co was supported on magnesia.

Using the catalyst, a carbon fiber was obtained by the same manner as in the Example 1. The relative proportions of the metal elements contained in the carbon fiber were the same as those of the catalyst. The weight gain was 7 times. In content of impurities, the amount of total metal element was 11.4% by mass, the amount of Fe element was 8.6% by mass, and the amount of Mg element derived from the carrier was 2.9% by mass.

COMPARATIVE EXAMPLE 4

(Mn(60)-Mo(10)/magnesia)

A catalyst was obtained by the same manner as in the Example 4 except that the cobalt (II) nitrate hexahydrate was not used. Using of the obtained catalyst in vapor phase growth reaction by the same manner as in the Example 4 had almost failed to gain a carbon fiber.

COMPARATIVE EXAMPLE 5

(Cr(10)-W(10)/magnesia)

A catalyst was obtained by the same manner as in the Example 7 except that the cobalt (II) nitrate hexahydrate was not used. Using of the obtained catalyst in vapor phase growth reaction by the same manner as in the Example 7 had almost failed to gain a carbon fiber.

As shown in Table 1 and Table 2, according to the producing method in the present invention, by dissolving or dispersing [I] a compound containing Co element., [II] a compound containing at least one element selected from the group consisting of Ti, V, Cr, and Mn and [III] a compound containing at least one element selected from the group consisting of W and Mo in a solvent to obtain a solution or a fluid dispersion, by impregnating a particulate carrier with the solution or the fluid dispersion so as to obtain a catalyst, and by bringing the catalyst into contact with a carbon source in a vapor phase, generation efficiency (weight gain) of a carbon fiber per catalyst mass becomes high and temperature dependency of the generation efficiency becomes low, and a data spread in the impurity concentration becomes small. The carbon fiber obtained by this method has small contents of metal elements as impurities and is excellent dispersibility in resin. The carbon fiber obtained in each example has the fiber diameter within a range of 10 to 30 nm and $d_0/d$ within the range of 0.2 to 0.4. Also, the carbon fiber obtained in each example had the length of the graphite layer within a range of 0.04 to 12 times as long as the fiber diameter, and was approximately 70% in the numerical ratio of the graphite layer being less than twice as long as the fiber diameter.

The invention claimed is:

1. A method for producing a carbon fiber, comprising steps of: dissolving or dispersing [I] a compound containing Co element; [II] a compound containing at least one element selected from the group consisting of Ti, V, and Cr; and [III] a compound containing at least one element selected from the group consisting of W and Mo in a solvent to obtain a solution or a fluid dispersion, impregnating a particulate carrier with the solution or the fluid dispersion to prepare a catalyst, and bringing a carbon source into contact with the catalyst in a vapor phase, wherein a total amount of the element [I], the element [II], and the element [III] is 5 to 100% by mass with respect to the particulate carrier.

2. The method for producing a carbon fiber according to claim 1, wherein the carrier is alumina, magnesia, titania, silica, calcium carbonate, calcium hydroxide or calcium oxide.

3. The method for producing a carbon fiber according to claim 1, wherein a temperature in the step of bringing the carbon source into contact with the catalyst in the vapor phase is 500 degrees cent. to 1000 degrees cent.

4. The method for producing a carbon fiber according to claim 1, further comprising
a step of reduction treatment of the catalyst before the step of bringing the carbon source into contact with the catalyst in a vapor phase.

5. The method for producing a carbon fiber according to claim 1, further comprising
a step of heat treatment at a temperature of 2000 degrees C. to 3500 degrees C. after the carbon fiber is produced.

6. The method for producing a carbon fiber according to claim 1, wherein [III] is a compound containing at least element W.

7. A method for producing a composite material, comprising steps of:

dissolving or dispersing [1] a compound containing Co element; [II] a compound containing at least one element selected from the group consisting of Ti, V, and Cr; and [III] a compound containing at least one element selected from the group consisting of W and Mo in a solvent to obtain a solution or a fluid dispersion, impregnating a particulate carrier with the solution or the fluid dispersion to prepare a catalyst, bringing a carbon source into contact with the catalyst in a vapor phase to obtain a carbon fiber, and kneading the carbon fiber and a resin, wherein a total amount of the element [I], the element [II], and the element [III] is 5 to 100% by mass with respect to the particulate carrier.

8. The method for producing a composite material according to claim 7, further comprising
a step of heat treatment at a temperature of 2000 degrees C. to 3500 degrees C. after the carbon fiber is produced.

9. The method for producing a composite material according to claim 7, wherein [III] is a compound containing at least element W.

* * * * *